(12) United States Patent
Geudner et al.

(10) Patent No.: US 8,398,281 B2
(45) Date of Patent: Mar. 19, 2013

(54) INTERIOR TRIM PANEL WITH AT LEAST ONE LIGHTING ELEMENT AND METHOD FOR PRODUCING AN INTERIOR TRIM PANEL OF THIS KIND

(75) Inventors: Thomas Geudner, Maselheim (DE); Ulli Anhorn, Laichingen (DE); Thomas Renz, Ochsenhausen (DE); Wolfgang Bruss, Vohringen (DE)

(73) Assignee: Airbus Operations GmbH (DE)

( * ) Notice: Subject to any disclaimer, the term of this patent is extended or adjusted under 35 U.S.C. 154(b) by 228 days.

(21) Appl. No.: 12/601,382

(22) PCT Filed: Jun. 17, 2008

(86) PCT No.: PCT/EP2008/004872
§ 371 (c)(1),
(2), (4) Date: Nov. 23, 2009

(87) PCT Pub. No.: WO2009/000448
PCT Pub. Date: Dec. 31, 2008

(65) Prior Publication Data
US 2010/0165622 A1    Jul. 1, 2010

Related U.S. Application Data

(60) Provisional application No. 60/945,960, filed on Jun. 25, 2007.

(30) Foreign Application Priority Data

Jun. 25, 2007  (DE) .......................... 10 2007 029 140

(51) Int. Cl.
*F21V 17/00*    (2006.01)
(52) U.S. Cl. ...................................... 362/488; 362/471

(58) Field of Classification Search .................. 362/417, 362/488, 471
See application file for complete search history.

(56) References Cited

U.S. PATENT DOCUMENTS

| 6,160,475 A | * | 12/2000 | Hornung et al. ............... 340/461 |
| 2005/0018439 A1 | * | 1/2005 | Schevardo et al. ............. 362/471 |
| 2005/0116818 A1 | * | 6/2005 | Kennedy et al. ............... 340/500 |
| 2006/0176710 A1 | * | 8/2006 | Meinke et al. ................. 362/503 |

FOREIGN PATENT DOCUMENTS

| DE | 39 42 450 A1 | 2/1991 |
| DE | 198 22 636 A1 | 11/1999 |
| DE | 199 49 964 A1 | 4/2001 |
| DE | 103 31 075 A1 | 2/2005 |
| DE | 103 31 076 A1 | 2/2005 |
| DE | 10 2004 010974 A1 | 10/2005 |
| DE | 10 2004 026 835 A1 | 12/2005 |
| EP | 1 102 231 A | 5/2001 |
| EP | 1 495 910 A | 1/2005 |

OTHER PUBLICATIONS

International Search Report for Appln. No. PCT/EP2008/004872 completed Oct. 23, 2008.

* cited by examiner

*Primary Examiner* — Evan Dzierzynski
(74) *Attorney, Agent, or Firm* — Carter, DeLuca, Farrell & Schmidt, LLP

(57) ABSTRACT

An interior trim panel (10) comprises at least one lighting element (12). The lighting element (12) comprises a light-conducting body (14) arranged in a receiving bore (22) formed in the interior trim panel (10), wherein the light-conducting body (14) comprises a light entry face (16) and a light exit face (18) arranged in the area of a panel surface (26) visible in the mounted state of the interior trim panel (10). The visible panel surface (26) and the light exit face (16) of the light-conducting body (14) are provided with a continuous layer of lacquer (28).

18 Claims, 3 Drawing Sheets

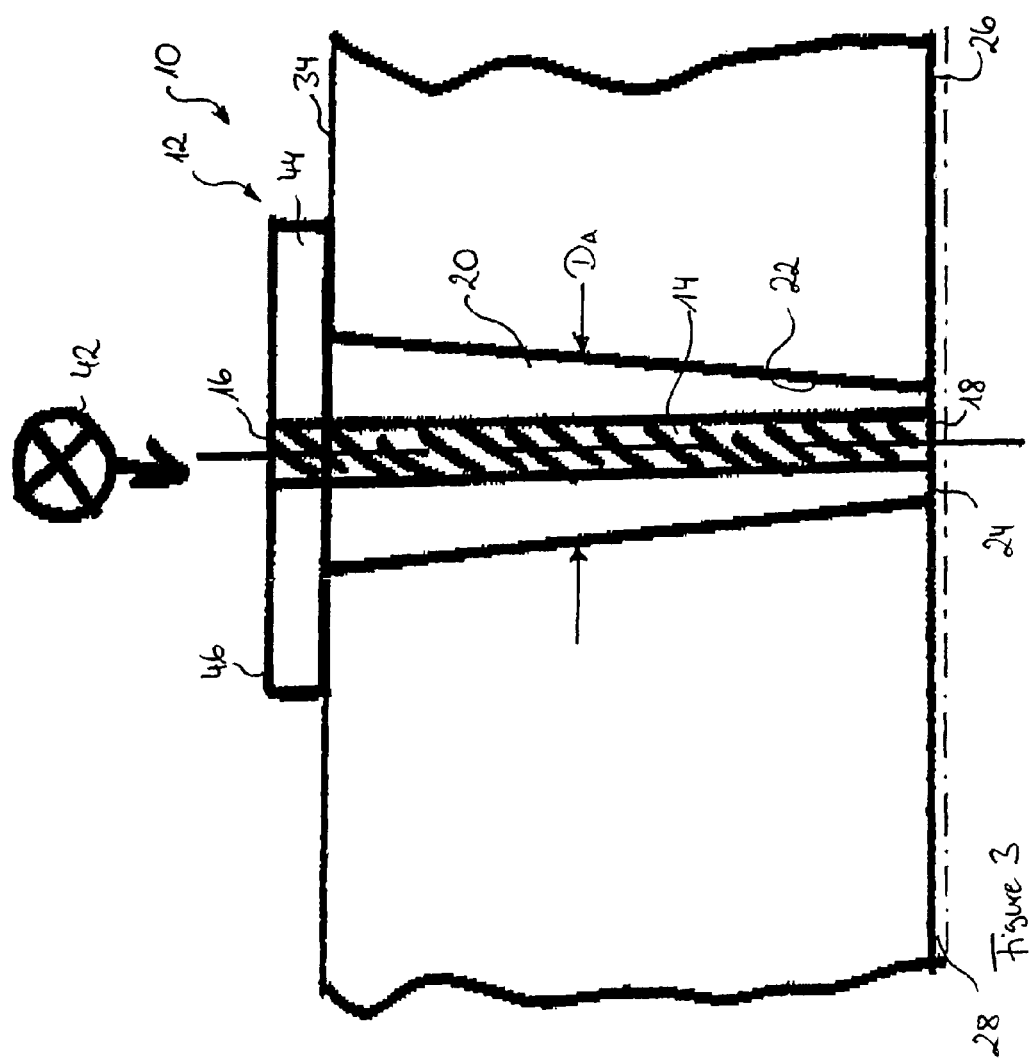

Figure 1:
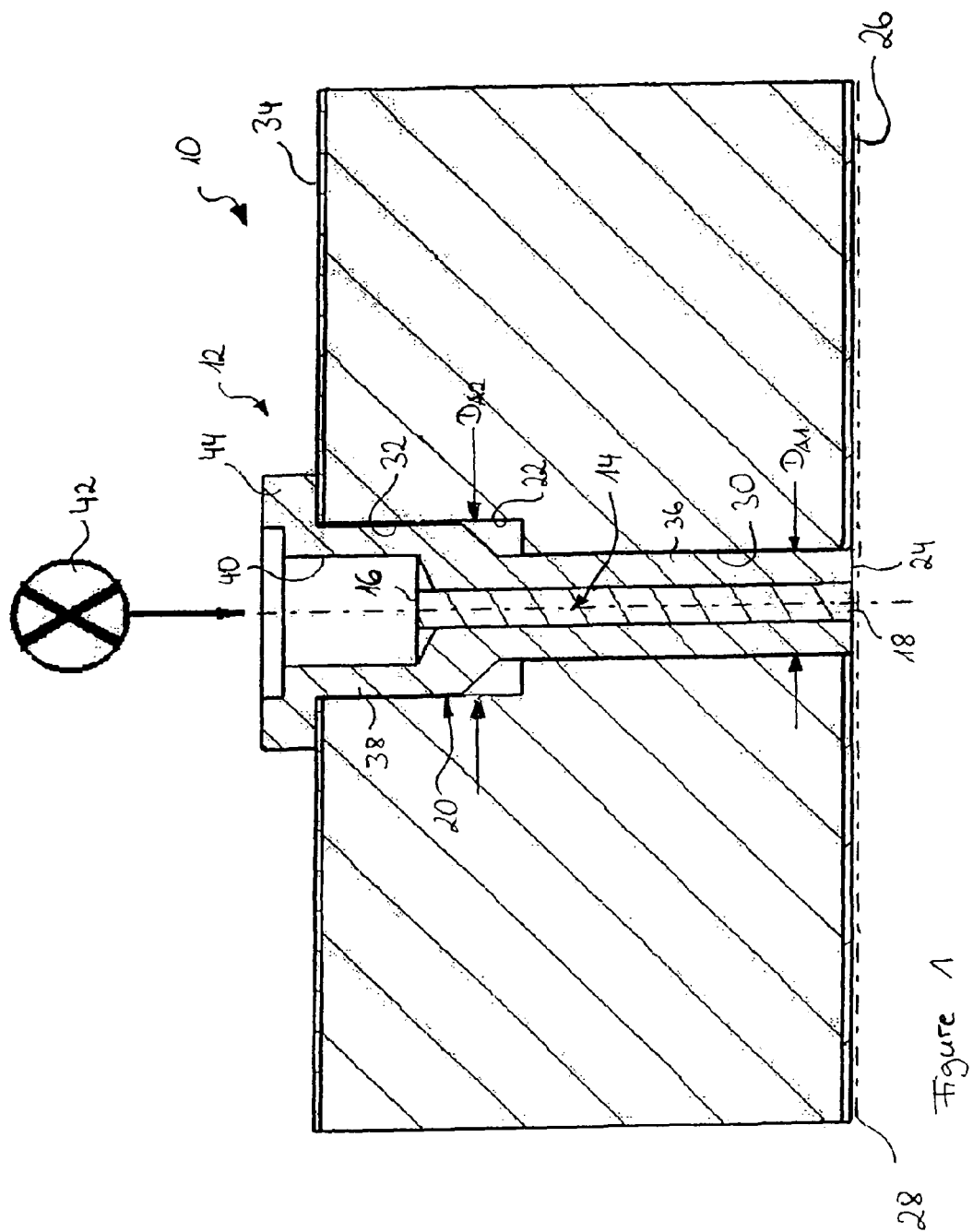

INTERIOR TRIM PANEL WITH AT LEAST ONE LIGHTING ELEMENT AND METHOD FOR PRODUCING AN INTERIOR TRIM PANEL OF THIS KIND

The invention relates to an interior trim panel with at least one lighting element comprising a light-conducting body arranged in a receiving bore formed in the interior trim panel, wherein the light-conducting body comprises a light entry face and a light exit face arranged in the area of a panel surface visible in the mounted state of the interior trim panel. The invention further relates to a method for producing an interior trim panel of this kind.

An interior trim panel known from DE 103 31 076 A1 and suitable for simulating a starlit sky in an aircraft cabin has a plurality of receiving bores formed in the panel, into which a support bush is glued in each case. Each support bush is positioned in its receiving bore in such a way that one of its end faces occludes flush with a visible surface of the panel which faces the interior of the aircraft cabin in the mounted state of the panel. To improve the visual appearance of the panel the end faces of the support bushes are provided with lacquering, corresponding to the lacquering of the visible panel surface. Into each support bush is inserted a light-conducting body, consisting of a transparent material, with a light entry face via which light emitted by a light-emitting diode is coupled into the light-conducting body. A light exit face of the light-conducting body is aligned flush with the end face of the support bush and the visible panel surface.

During manufacture of the interior trim panel known from the prior art up to 100 support bushes are glued individually into the receiving bores provided in the interior trim panel and at the same time adjusted in such a way that their end faces occlude flush with the visible panel surface. Then each support bush is provided manually with a bore for receiving the light-conducting body and the light-emitting diode. To simplify the positioning of the light-conducting bodies in the support bushes, an inner thread is formed in at least one section of the bores formed in the support bushes. The light-conducting bodies, which have an outer thread on their outer face, can then be screwed into the bores formed in the support bushes in such a way that their light exit faces are aligned flush with the end faces of the support bushes and the visible panel surface.

The production of the interior trim panel is very time-consuming and therefore expensive, owing in particular to the adjusting steps required to guarantee that the light exit faces of the light-conducting bodies and the end faces of the support bushes are aligned flush with the visible panel surface. Moreover, there is the problem that the visual appearance of the visible panel surface is impaired by the bores formed in the support bushes for accommodating the light-conducting bodies, which in normal lighting appear as black dots on the visible panel surface.

The invention is directed to the object of providing an interior trim panel comprising at least one lighting element, which is easy to manufacture and has an improved visual appearance. The invention is further directed at the object of providing a method for producing an interior trim panel of this kind.

To achieve this object an interior trim panel according to the invention has at least one lighting element comprising a light-conducting body. The interior trim panel according to the invention may be provided with only one lighting element. However, the interior trim panel according to the invention preferably has a plurality of lighting elements, each comprising a light-conducting body. The light-conducting body of the lighting element is arranged in a receiving bore formed in the interior trim panel and comprises a light entry face and a light exit face. The light exit face of the light-conducting body is arranged in the area of a panel surface visible in the mounted state of the interior trim panel. If the interior trim panel according to the invention is provided for use as a wall-covering panel or ceiling-covering panel, the surface of the panel which in the mounted state of the interior trim panel is facing the area, the wall or ceiling of which is covered with the interior trim panel, is understood to be the panel surface visible in the mounted state of the interior trim panel.

The interior trim panel according to the invention is distinguished in that the light exit face of the light-conducting body is aligned flush with the visible panel surface and in that the visible panel surface and the light exit face of the light-conducting body, i.e. the face of the light-conducting body which extends in the area of the visible panel surface and from which light conducted through the light-conducting body emerges from the light-conducting body, are provided with a continuous layer of lacquer. In other words, the interior trim panel according to the invention is provided with a layer of lacquer extending over both the visible panel surface and the light exit face of the lighting body.

By applying a continuous layer of lacquer to the visible panel surface, minor manufacturing and mounting tolerances which lead to the light exit face of the light-conducting body not being aligned completely flush with the visible panel surface can be compensated for or at least hidden. This advantageously reduces the adjustment outlay during manufacture of the interior trim panel. Moreover, by applying the continuous layer of lacquer to the visible panel surface and the light exit face of the light-conducting body on the side of the interior trim panel visible to an observer in the mounted state of the interior trim panel, a continuous surface layer is created on the interior trim panel. When the lighting element provided in the interior trim panel to is not illuminated, i.e. no light is emerging from the light exit face of the light-conducting body, the light exit face is concealed by the surface layer formed by the continuous layer of lacquer and is therefore invisible. This advantageously improves the visual appearance of the interior trim panel according to the invention in normal lighting, i.e. when the lighting element is not illuminated.

The interior trim panel according to the invention preferably comprises a light source, which is equipped to emit light which can be coupled into the light-conducting body via the light entry face of the light-conducting body. If the interior trim panel according to the invention has a plurality of lighting elements, each lighting element may have a separate light source. Alternatively, it is also conceivable, however, to couple the light emitted by a single light source into the light-conducting bodies of these lighting elements via the light entry faces of the light-conducting bodies of several or all the lighting elements provided in the interior trim panel. A light-emitting diode may be used as light source, for example.

The light source may preferably be triggered by means of an appropriate control device. With the aid of the control device the light source can be controlled in such a way that it emits light with a desired brightness, light with an even brightness or light with a varying brightness, such as, e.g. a flashing or flickering light.

The light source and the continuous layer of lacquer applied to the visible panel surface and the light exit face of the light-conducting body are preferably coordinated with one another in such a way that the light emerging from the light exit face of the light-conducting body and radiated through the layer of lacquer has a desired brightness and/or a desired colour. In this preferred configuration of the interior trim panel according to the invention account is taken of the fact that the intensity, i.e. the brightness, and the colour of the light radiated via the light exit face of the light-conducting body are influenced by the layer of lacquer applied to the light exit face of the light-conducting body.

The extent of influencing of the brightness and colour of the light emerging from the light exit face of the light-conducting body by the layer of lacquer applied to the light exit face of the light-conducting body depends on the colour of the layer of lacquer, the light transmission properties of the layer of lacquer and the thickness of the layer of lacquer. If these parameters of the layer of lacquer are determined, for example, by the desired visual appearance of the visible panel surface, the brightness and colour of the light radiated from the light exit face of the light-conducting body through the layer of lacquer may be influenced by appropriate selection and/or appropriate triggering of the light source. For example, a light-emitting diode emitting light with a specific light colour may be used as light source or the light source may be triggered in such a way that it emits light of a desired brightness.

If a specific light source is to be used in the lighting element of the interior trim panel according to the invention, the continuous layer of lacquer applied to the visible panel surface and the light exit face of the light-conducting body may be varied in colour, light transmission and layer thickness, in order to retain a desired brightness and colour of the light emerging from the light exit face of the light-conducting body and radiated through the layer of lacquer. Naturally it is also conceivable to vary both the parameters of the layer of lacquer, i.e. for example the colour, the light transmission and the layer thickness of the layer of lacquer, and the parameters of the light source, i.e. for example the colour and the intensity, i.e. the brightness, of the light emitted by the light source, as desired.

In an embodiment of the interior trim panel according to the invention the light-conducting body of the lighting element is arranged directly in the receiving bore formed in the interior trim panel. The light-conducting body can be fixed in position in the receiving bore formed in the interior trim panel by gluing.

Alternatively, however, the light-conducting body may also be formed integral with an insert accommodating the light-conducting body. The light-conducting body is then arranged in the insert, which in turn is inserted into the receiving bore formed in the interior trim panel. A light-conducting body accommodated in an insert is particularly well protected from damage which could impair its light-conducting properties. The light-conducting body and the insert may be in the form of an independently manageable assembly. An independently manageable assembly comprising the light-conducting body and the insert can be inserted into the receiving bore formed in the interior trim panel in a simple and time-saving manner in a single operating step and fixed in position in the receiving bore formed in the interior trim panel by gluing.

The light-conducting body may consist of any light-transparent material, such as glass or a transparent plastics material, for example. The light-conducting body preferably, however, consists of polycarbonate, in particular Lexan® 953A. The insert preferably consists of plastics material, such as, e.g. polyetherimide, in particular Ultem® 9075. This material is distinguished by good mechanical properties and excellent behaviour in fire.

The insert preferably has an outwardly projecting flange section, which rests against a panel surface opposite the visible panel surface. The insert and the light-conducting body accommodated in the insert can easily be positioned in the receiving bore formed in the interior trim panel with the aid of the outwardly projecting flange section. Moreover, an adhesive may be applied to a surface of the outwardly projecting flange section, which cooperates with the panel surface opposite the visible panel surface, and/or to the panel surface opposite the visible panel surface, in order to fix the insert with the light-conducting body accommodated therein securely in position in the receiving bore formed in the interior trim panel.

The insert may comprise an end face arranged in the area of the visible panel surface and surrounding the light exit face of the light-conducting body. This end face of the insert is preferably likewise provided with the continuous layer of lacquer applied to the visible panel surface and the light exit face of the light-conducting body. This ensures that the side of the interior trim panel visible to an observer in the mounted state of the interior trim panel has a perfect visual appearance even if the light-conducting body is accommodated in an insert.

The insert may, for example, be designed in the form of a sleeve, into which the light-conducting body can be inserted. The receiving bore formed in the interior trim panel may comprise a first section which extends from the visible panel surface in the direction of a panel core. Moreover, the receiving bore formed in the interior trim panel may comprise a second section which extends from the panel surface opposite the visible panel surface in the direction of the panel core. The diameter of the first section of the receiving bore is preferably smaller than the diameter of the second section of the receiving bore.

If the light-conducting body is inserted directly into the receiving bore formed in the interior trim panel, the light-conducting body preferably has a first section with a first diameter matched to the diameter of the first section of the receiving bore and a second section with a second diameter matched to the diameter of the second section of the receiving bore.

The light-conducting body is, however, preferably cylindrical in shape and accommodated in an insert designed in the form of a sleeve, which comprises a first section with a first diameter matched to the diameter of the first section of the receiving bore and a second section with a second diameter matched to the diameter of the second section of the receiving bore. In its second section the insert may be provided, for example, with an inner bore for accommodating a light source designed in the form of a light-emitting diode or such. The light entry face of the light-conducting body is then preferably arranged in the area of the inner bore formed in the second section of the insert in such a way that the light emitted by the light source can be coupled into the light entry face of the light-conducting body unhindered. The light-conducting body then preferably extends through the first section of the insert in the direction of the visible panel surface.

Alternatively, the receiving bore formed in the interior trim panel may also be substantially cylindrical in shape and have a substantially constant diameter.

If the light-conducting body is inserted directly into the receiving bore formed in the interior trim panel, the light-conducting body is then preferably substantially cylindrical in shape and has a constant diameter matched to the constant diameter of the receiving bore.

If, on the other hand, the light-conducting body is accommodated in an insert, the insert may be substantially cylindrical in shape and have a constant diameter matched to the diameter of the receiving bore.

Finally, the receiving bore formed in the interior trim panel may also be substantially conical in shape and have a diameter decreasing in the direction of the visible panel surface. A substantially conically shaped receiving bore with a diameter decreasing in the direction of the panel surface opposite the visible panel surface is likewise conceivable.

If the light-conducting body is inserted directly into the receiving bore formed in the interior trim panel, the light-conducting body is then preferably substantially conical in shape and has a varying diameter matched to the varying diameter of the receiving bore.

If, on the other hand, the light-conducting body is accommodated in an insert, the insert may be substantially conical in shape and have a varying diameter matched to the varying diameter of the receiving bore.

A method according to the invention for producing an interior trim panel with at least one lighting element comprises the forming of a receiving bore in the interior trim panel. A light-conducting body with a light entry face and a light exit face is arranged in the receiving bore formed in the interior trim panel in such a way that the light exit face of the light-conducting body is arranged in the area of a panel face visible in the mounted state of the interior trim panel. The light-conducting body is preferably fastened in the receiving bore formed in the interior trim panel by gluing. The light exit face of the light-conducting body is aligned flush with the visible panel surface. The visible panel surface and the light exit face of the light-conducting body are provided with a continuous layer of lacquer.

In a particularly preferred embodiment of the method according to the invention for producing an interior trim panel a section of the light-conducting body projecting above the visible panel surface after the light-conducting body has been arranged in the receiving bore formed in the interior trim panel is ground off, in order to align the light exit face of the light-conducting body flush with the panel surface visible in the mounted state of the interior trim panel. Grinding off a section of the light-conducting body possibly projecting above the visible panel surface is preferably done before the continuous layer of lacquer is applied to the visible panel surface and the light exit face of the light-conducting body. Grinding off a section of the light-conducting body possibly projecting above the visible panel surface has the advantage that it is possible to dispense with complicated adjustment of the light-conducting body in the receiving bore formed in the interior trim panel for flush alignment of the light exit face of the light-conducting body with the visible panel surface.

If the light-conducting body is shaped and/or arranged in the receiving bore formed in the interior trim panel in such a way that it does not have a section projecting above the visible panel surface, grinding off can of course be dispensed with. It is further conceivable, in particular with an interior trim panel which has a multiplicity of lighting elements, that some light-conducting bodies may have a section projecting above the visible panel surface, while other light-conducting bodies do not have a section projecting above the visible panel surface. In such a case the visible panel surface is preferably ground over a large area, in order to remove all the light-conducting body sections projecting above the visible panel surface and to ensure that the light exit faces of all the light-conducting bodies are aligned flush with the visible panel surface.

A light source is preferably provided and arranged in such a way that light emitted by it can be coupled into the light-conducting body via the light entry face of the light-conducting body. Basically a light source can be provided for each lighting element of the interior trim panel. Alternatively, however, it is also conceivable to provide a light source and to arrange it in such a way that light emitted by it can be coupled into the light-conducting bodies of these lighting elements via the light entry faces of the light-conducting bodies of several or all the lighting elements provided in the interior trim panel.

In the method according to the invention for producing an interior trim panel the light-conducting body may be arranged directly in the receiving bore formed in the interior trim panel. However, the light-conducting body is preferably arranged in the receiving bore formed in the interior trim panel together with an insert formed integral with the light-conducting body and accommodating the light-conducting body. The insert with the light-conducting body accommodated in the insert can be fixed in position in the receiving bore formed in the interior trim panel by gluing. A light-conducting body accommodated in an insert is particularly well protected from damage which could impair its light-conducting properties, in particular during mounting in the receiving bore formed in the interior trim panel.

The light-conducting body and the insert are preferably arranged in the receiving bore formed in the interior trim panel in such a way that an outwardly projecting flange section of the insert rests against a panel surface opposite the visible panel surface. For secure fixing of the insert and the light-conducting body in position in the receiving bore formed in the interior trim panel a surface of the flange section and the panel surface cooperating with the surface of the flange section and opposite the visible panel surface may be glued together.

If the light-conducting body in the method according to the invention for producing an interior trim panel is arranged in the receiving bore formed in the interior trim panel with an insert accommodating the light-conducting body, the method preferably further provides that a section of the insert projecting above the visible panel surface after the insert has been arranged with the light-conducting body in the receiving bore formed in the interior trim panel is ground off. Grinding off a section of the insert possibly projecting above the visible panel surface is preferably done in one operation with grinding off a section of the light-conducting body possibly projecting above the visible panel surface. This ensures that an end face of the insert arranged in the area of the visible panel surface is aligned flush with the visible panel surface and the light exit face of the light-conducting body.

If the insert is shaped and/or arranged in the receiving bore formed in the interior trim panel in such a way that it does not have a section projecting above the visible panel surface, grinding off can of course be dispensed with. It is further conceivable, in particular with an interior trim panel which has a multiplicity of lighting elements, that some inserts have a section projecting above the visible panel surface, while other inserts do not have a section projecting above the visible panel surface. In such a case the visible panel surface is preferably ground over a large area, in order to remove all the insert sections projecting above the visible panel surface and to ensure that the end faces of all the inserts are aligned flush with the light exit faces of the light-conducting bodies and the visible panel surface.

If the light-conducting body is accommodated in an insert which comprises an end face arranged in the area of the visible panel surface, the method according to the invention for producing an interior trim panel preferably further provides that the end face of the insert arranged in the area of the visible panel surface is likewise provided with the continuous layer of lacquer applied to the visible panel surface and the light exit face of the light-conducting body.

An interior trim panel according to the invention comprising a plurality of lighting elements is particularly well suited for use in an aircraft cabin. An interior trim panel according to the invention designed as a ceiling covering panel, for example, can be used for simulating a starlit sky in the aircraft cabin.

Figure 2:
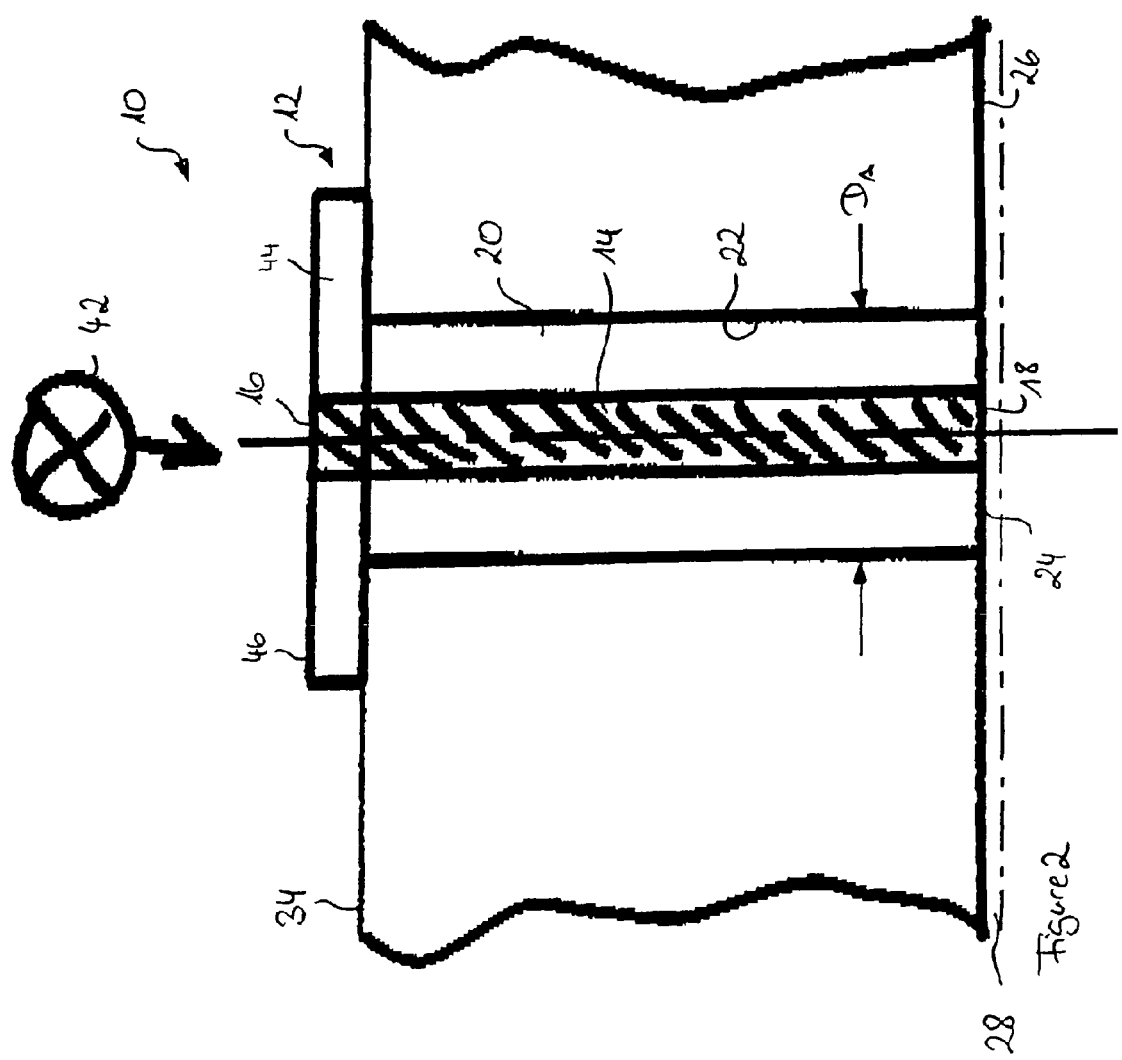

Preferred embodiments of the present invention are now explained in greater detail using the attached schematic figures, wherein FIG. 1 shows a detail of a first embodiment of an interior trim panel according to the invention, comprising a plurality of lighting elements, in cross-section, FIG. 2 shows a detail of a second embodiment of an interior trim panel according to the invention, comprising a plurality of lighting elements, in cross-section, and FIG. 3 shows a detail of a third embodiment of an interior trim panel according to the invention, comprising a plurality of lighting elements, in cross-section.

An interior trim panel 10 shown in a detailed illustration in FIG. 1 comprises a plurality of lighting elements 12 arranged distributed in the interior trim panel. The interior trim panel 10 is provided to be used as a ceiling-covering panel in an aircraft cabin. The lighting elements 12 serve to simulate a starlit sky if so desired.

Each lighting element 12 comprises a cylindrically shaped light-conducting body 14, which has a light entry face 16 on a first end and a light exit face 18 on a second end. The light-conducting body 14 consists of Lexan® 953A and is accommodated in an insert 20 consisting of Ultem® 9075 and designed in the form of a hollow-cylindrical sleeve. The insert 20 and the light-conducting body 14 of the lighting element 12 accommodated in the insert 20 are arranged in a receiving bore 22 which is formed in the interior trim panel 10 and extends through the interior trim panel 10.

As can be seen from FIG. 1, the light exit face 18 of the light-conducting body 14 and a circular end face 24 of the insert 20 surrounding the light exit face 18 of the light-conducting body 14 are arranged in the area of a panel surface 26 visible to an observer in the mounted state of the interior trim panel 10 and aligned flush with the visible panel surface 26. A continuous layer of lacquer is applied to the visible panel surface 26, the end face 24 of the insert 20 and the light exit face 18 of the light-conducting body 14.

The receiving bore 22 formed in the interior trim panel 10 has a first section 30 which extends from the visible panel surface 26 in the direction of a panel core. Moreover, the receiving bore 22 formed in the interior trim panel 10 comprises a second section 32, which extends from a panel surface 34 opposite the visible panel surface 26 in the direction of the panel core. The diameter $D_{A1}$ of the first section 30 of the receiving bore 22 is smaller than the diameter $D_{A2}$ of the second section 32 of the receiving bore 22.

The insert 20 accommodating the light-conducting body 14 comprises a first section 36 which has a first outer diameter matched to the diameter $D_{A1}$ of the first section of the receiving bore 22. A second section 38 of the insert 20 has a second outer diameter matched to the diameter $D_{A2}$ of the second section 32 of the receiving bore 22. In the area of its second section 38 the insert 20 is provided with an inner bore 40 which is provided to accommodate a light source 42 designed in the form of a light-emitting diode. Light emitted by the light source 42 can be coupled into the light-conducting body 14 via the light entry face 16 of the light-conducting body 14. Finally, the insert 20 comprises a flange section 44, which projects radially outwards and rests against the panel surface 34 opposite the visible panel surface 26.

Because of the layer of lacquer 28 applied to the visible panel surface 26, the end face 24 of the insert 20 and the light exit face 18 of the light-conducting body 14, an excellent visual appearance of the interior trim panel 10 is guaranteed, since the end face 24 of the insert 20 and the light exit face 18 of the light-conducting body 14 are not visible in normal lighting, i.e. when the light source 42 is not emitting any light. However, it must be taken into account that the light emerging from the light exit face 18 of the light-conducting body 14 is radiated through the layer of lacquer 28. The colour and intensity, i.e. the brightness, of the light emitted by the light source 42 and the colour, the light transmission and the layer thickness of the layer of lacquer 28 are therefore coordinated with one another in such a way that the light emerging from the light exit face 18 of the light-conducting body 14 and radiated through the layer of lacquer 28 has a desired brightness and colour to an observer. Moreover, the light source 42 is triggered by a control unit, not shown in the figure, in such a way that the light source 42 emits light of a constant brightness or light of a varying brightness to generate a flickering or flashing light, as wished.

During production of the interior trim panel 10 firstly the desired number of receiving bores 22 is formed in the interior trim panel 10. Then a light-conducting body 14, pre-assembled with an insert 20 to form an independently manageable assembly, is inserted into each receiving bore 22. The insert 20 and the light-conducting body 14 are arranged in the receiving bore 22 in such a way that the flange section 44 of the insert 20, projecting radially outwards, comes into contact with the panel surface 34 opposite the visible panel surface 26. Fastening of the inserts 20 and the light-conducting bodies 14 in the receiving bores 22 is done by gluing.

A light source 42 designed in the form of a light-emitting diode may be arranged in the inner bore 40 formed in the second section 38 of each insert 20, after the insert 20 with the light-conducting body 14 has been positioned in its appropriate receiving bore 22. Alternatively, it is also possible, however, to arrange the light source 42 in the inner bore 40 formed in the second section 38 of the insert 20, before the insert 20 with the light-conducting body 14 is arranged in the receiving bore 22.

After the assemblies, each comprising an insert 20 and a light-conducting body 14, have been arranged in the receiving bores 22 formed in the interior trim panel 10, any sections of the light-conducting bodies 14 and the inserts 20 projecting above the visible panel surface 26 are ground off by large-area grinding of the panel 10. This ensures that the light exit faces 18 of all the light-conducting bodies 14 and the end faces 24 of all the inserts 20 are aligned flush with the visible panel surface 26.

In a last step the visible panel surface 26, the light exit faces 18 of the light-conducting bodies 14 and the end faces 24 of the inserts 20 surrounding the light exit faces 18 of the light-conducting bodies 14 are provided with the continuous layer of lacquer 28. During application of the layer of lacquer 28 the layer thickness of the layer of lacquer 28 is adapted in such a way that light from the light source 42 radiated through the layer of lacquer 28 has a desired colour and a desired brightness.

The interior trim panel 10 shown in a detailed illustration in FIG. 2 differs from the arrangement illustrated in FIG. 1 in the configuration of the receiving bore 22, the insert 20 and the light-conducting body 14. In panel 10 according to FIG. 2 the receiving bore 22 has a cylindrical shape with a constant diameter $D_A$. The insert 20, designed in the form of a hollow-cylindrical sleeve, has a constant outer diameter matched to the constant diameter $D_A$ of the receiving bore 22.

By contrast with the configuration of interior trim panel 10 illustrated in FIG. 1, the light-conducting body 14 extends from the visible panel surface 26 to an end face 46 of the flange section 44. Alternatively, the light-conducting body 14 could, however, also be designed with a smaller length than the insert 20. The light entry face 16 of the light-conducting body 14 would then be arranged inside the insert 20.

Otherwise, the construction of interior trim panel 10 according to FIG. 2 corresponds to the construction of the arrangement according to FIG. 1. The production method described in connection with panel 10 illustrated in FIG. 1 is also used to produce interior trim panel 10 according to FIG. 2.

The interior trim panel 10 shown in a detailed illustration in FIG. 3 likewise differs from the arrangement illustrated in FIG. 1 in the configuration of the receiving bore 22, the insert 20 and the light-conducting body 14. In panel 10 according to FIG. 3 the receiving bore 22 has a conical shape with a diameter $D_A$ decreasing in the direction of the visible panel surface 26. The insert 20 has an outer diameter decreasing in the direction of the visible panel surface 26 matched to the diameter $D_A$ of the receiving bore 22 decreasing in the direction of the visible panel surface 26.

The light-conducting body 14 extends from the visible panel surface 26 to the end face 46 of the flange section 44. Alternatively, the light-conducting body 14 could, however, also be designed with a smaller length than the insert 20. The light entry face 16 of the light-conducting body 14 would then be arranged inside the insert 20.

Otherwise, the construction of interior trim panel 10 according to FIG. 3 corresponds to the construction of the arrangement according to FIG. 1. The production method described in connection with panel 10 illustrated in FIG. 1 is also used to produce interior trim panel 10 according to FIG. 3.

The invention claimed is:

1. Interior trim panel with at least one lighting element, comprising:
    a light-conducting body, arranged in a receiving bore formed in the interior trim panel, wherein the light-conducting body includes a light entry face and a light exit face arranged in the area of a panel surface visible in the mounted state of the interior trim panel, wherein the light exit face of the light-conducting body is aligned flush with the visible panel surface and the visible panel surface and the light exit face of the light-conducting body are provided with a continuous layer of lacquer, the continuous layer of lacquer being adapted to conceal the light exit face of the light-conducting body when no light is emerging from the light exit face of the light-conducting body, and wherein the light-conducting body is accommodated in an insert, the insert having an outwardly projecting flange section being dimensioned larger than the diameter of the receiving bore such that the flange section rests against a panel surface opposite the visible panel surface, the flange section sitting proud of the panel surface and the receiving bore.

2. Interior trim panel according to claim 1, further comprising a light source, which is equipped to emit light which can be coupled into the light-conducting body via the light entry face of the light-conducting body.

3. Interior trim panel according to claim 2, wherein the light source and the continuous layer of lacquer applied to the visible panel surface and the light exit face of the light-conducting body are coordinated with one another in such a way that the light emerging from the light exit face of the light-conducting body and radiated through the layer of lacquer has a desired brightness and colour.

4. Interior trim panel according to claim 1 wherein the light-conducting body is formed integral with the insert accommodating the light-conducting body.

5. Interior trim panel according to claim 4, wherein the insert includes a first section with a first diameter matched to the diameter of the first section of the receiving bore and a second section with a second diameter matched to the diameter of the second section of the receiving bore.

6. Interior trim panel according to claim 1, wherein an end face of the insert which is arranged in the area of the visible panel surface is likewise provided with the continuous layer of lacquer applied to the visible panel surface and the light exit face of the light-conducting body.

7. Interior trim panel according to claim 1, wherein the receiving bore formed in the interior trim panel includes a first section extending from the visible panel surface and a second section extending from the panel surface opposite the visible panel surface, wherein the diameter of the first section of the receiving bore is smaller than the diameter of the second section of the receiving bore.

8. Interior trim panel according to claim 1, wherein the receiving bore formed in the interior trim panel is substantially cylindrical in shape and has a substantially constant diameter.

9. Interior trim panel according to claim 1, wherein the insert is substantially cylindrical in shape and has a diameter matched to the diameter of the receiving bore.

10. Interior trim panel according to claim 1, wherein the receiving bore formed in the interior trim panel is substantially conical in shape and has a diameter decreasing in the direction of the visible panel surface.

11. Interior trim panel according to claim 1, wherein the insert is substantially conical in shape and has a diameter decreasing in the direction of the visible panel surface and matched to the diameter of the receiving bore which decreases in the direction of the visible panel surface.

12. Method for producing an interior trim panel with at least one lighting element, comprising the steps of:
    forming a receiving bore in the interior trim panel; and
    arranging a light-conducting body with a light entry face and a light exit face in the receiving bore, so that the light exit face of the light-conducting body is arranged in the area of a panel surface visible in the mounted state of the interior trim panel, wherein the light exit face of the light-conducting body is aligned flush with the visible panel surface and the visible panel surface and the light exit face of the light-conducting body are provided with a continuous layer of lacquer, the continuous layer of lacquer being adapted to conceal the light exit face of the light-conducting body when no light is emerging from the light exit face of the light-conducting body, and wherein light-conducting body is arranged in the receiving bore formed in the interior trim panel together with an insert accommodating the light-conducting body, the insert having an outwardly projecting flange section being dimensioned larger than the diameter of the receiving bore such that the light-conducting body and the insert are arranged in the receiving bore formed in the interior trim panel in such a way that the flange section rests against a panel surface opposite the visible panel surface, the flange section sitting proud of the panel surface and the receiving bore.

13. Method according to claim 12, wherein a section of the light-conducting body projecting above the visible panel surface after the light-conducting body has been arranged in the receiving bore formed in the interior trim panel is ground off, in order to align the light exit face of the light-conducting body flush with the visible panel surface.

14. Method according to claim 12, wherein a light source is provided and arranged in such a way that light emitted by it can be coupled into the light-conducting body via the light entry face of the light-conducting body.

15. Method according to claim 12, wherein the insert is designed integral with the light-conducting body.

16. Method according to claim 12, wherein a section of the insert projecting above the visible panel surface after the insert has been arranged in the receiving bore formed in the interior trim panel is ground off, in order to align an end face of the insert arranged in the area of the visible panel surface flush with the visible panel surface.

17. Method according to claim 12, wherein an end face of the insert arranged in the area of the visible panel surface is likewise provided with the continuous layer of lacquer applied to the visible panel surface and the light exit face of the light-conducting body.

18. Interior trim panel with at least one lighting element, comprising:
a light-conducting body, arranged in a receiving bore formed in the interior trim panel, wherein the light-conducting body includes a light entry face and a light exit face arranged in the area of a panel surface visible in the mounted state of the interior trim panel, wherein the light exit face of the light-conducting body is aligned flush with the visible panel surface and the visible panel surface and the light exit face of the light-conducting body are provided with a continuous layer of lacquer, the continuous layer of lacquer being adapted to conceal the light exit face of the light-conducting body when no light is emerging from the light exit face of the light-conducting body, wherein at least one of a color, a light transmission property, and a thickness of the lacquer are selected to conceal the light exit face, and wherein the light-conducting body is accommodated in an insert, the insert having an outwardly projecting flange section being dimensioned larger than the diameter of the receiving bore such that the flange section rests against a panel surface opposite the visible panel surface, the flange section sitting proud of the panel surface and the receiving bore.

* * * * *